Feb. 16, 1965     J. R. ERMLICH     3,169,900
STRESS PATTERN TEMPERED GLASS SHEET AND
METHOD OF MAKING THE SAME
Filed Jan. 31, 1955
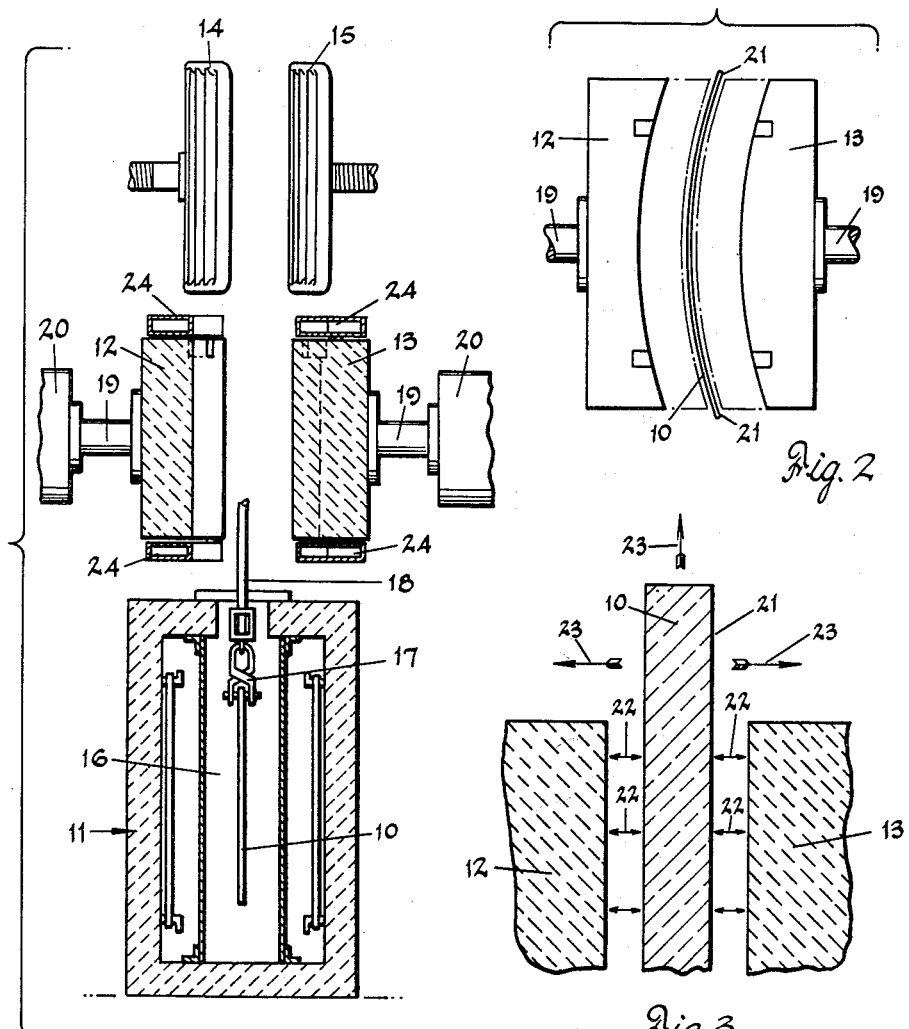
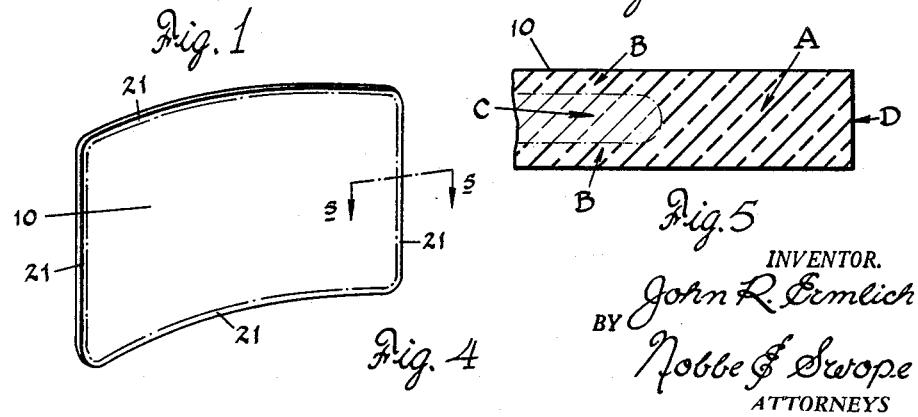
INVENTOR.
John R. Ermlich
BY Nobbe & Swope
ATTORNEYS United States Patent Office 3,169,900
Patented Feb. 16, 1965

3,169,900
STRESS PATTERN TEMPERED GLASS SHEET AND METHOD OF MAKING THE SAME
John R. Ermlich, Perrysburg, Ohio, assignor to Libbey-Owens-Ford Glass Company, Toledo, Ohio, a corporation of Ohio
Filed Jan. 31, 1955, Ser. No. 485,127
9 Claims. (Cl. 161—149)

The present invention relates to tempered or heat strengthened glass. More particularly, it has to do with a novel form of such glass that has improved strength and breaking characteristics, and with methods of and apparatus for producing the same.

Tempered or heat strengthened glass, particularly in sheet form, is well known in the art and is commonly produced commercially by first heating a sheet or plate of glass to approximately its point of softening and then rapidly and uniformly chilling the opposite major surfaces thereof to place the interior of the sheet under tension and the outside under compression.

This treatment greatly increases the mechanical strength of the glass and at the same time so modifies its breaking characteristics that, if and when broken, the entire sheet will disintegrate into innumerable small and relatively harmless fragments resembling the crystals of rock candy, instead of breaking into sharp edged pieces and long dangerous splinters as is the case with ordinary annealed glass.

It may be said that tempered glass is actually purposely strained glass, with the strain being carefully controlled so that the arrangement of the internal stresses set up by the heat treatment results in a structure that is substantially stronger and more resistant to impact, bending forces and so forth than is a sheet of annealed glass of comparable dimensions. More specifically, the average modulus of rupture of annealed glass is nominally 6,000 pounds per square inch, whereas the specification for full tempered glass requires a modulus of rupture of around 30,000 pounds per square inch. This additional strength results from the presence of compression layers at the facing or major surfaces of the tempered glass which gives a sheet of this character a compression at these surfaces of 24,000 pounds per square inch and make it approximately five times as strong as the annealed glass.

With all of these advantages, however, present commercially tempered or heat strengthened glass possess one very definite weakness, or what might be termed an "Achilles' heel." This is the periphery or edge of such sheets which are quite susceptible to breakage. In fact, an impact on the edge of a sheet of tempered glass, that might produce nothing more than a local chip or fracture in the edge of a sheet of well annealed glass, very often results in the total failure and complete disintegration of the heat strengthened sheet.

Now it is the primary object of this invention to overcome the edge weakness which has heretofore been considered a characteristic of tempered glass sheets by altering the stress pattern thereof.

Another object is to provide a tempered glass product in which the stress pattern is more nearly uniformly compressive at every surface.

Another object is to produce a sheet of tempered glass having a special protective compressive zone around the periphery thereof.

Another object is the provision of a method of tempering glass sheets in which a peripheral zone around a heated glass sheet is first cooled down through the annealing range of the glass, with the central portion of the sheet being maintained hot, before the entire sheet is finally chilled.

Another object is to provide a tempered glass article which will stand up under more than normally rough handling, and which may be put through such fabrication operations as seaming, drilling, punching etc. without disintegration.

Still another object is the provision of tempered glass sheets for use in high temperature installations in which normal thermal gradients produce temporary regional tensions about the periphery of the glass.

Further objects and advantages will become more apparent during the course of the following description, when taken in connection with the accompanying drawings.

In the drawings, wherein like numerals are employed to designate like parts throughout the same:

FIG. 1 is a vertical sectional view of one form of apparatus that may be employed in carrying out the invention;

FIG. 2 is a top plan view of the bending molds of the apparatus of FIG. 1;

FIG. 3 is a fragmentary sectional view through the bending molds and a bent glass sheet being tempered, illustrating diagrammatically certain steps in the heat treating procedure;

FIG. 4 is a perspective view of a bent and tempered glass sheet that has been produced in accordance with the invention; and FIG. 5 is a section taken substantially along the line 5—5 of FIG. 4.

Referring now more specifically to the drawings, there has been illustrated diagrammatically in FIG. 5 the stress pattern of a tempered glass sheet which has been produced in accordance with this invention.

As indicated above, the objects and advantages of the invention are accomplished by setting up a special pattern of streses in the tempered glass sheet, and particularly in a peripheral zone of the glass that is located at and extends entirely around the margin of the sheet. Such a zone is indicated diagrammatically at A in the glass sheet 10 of FIG. 5 and exhibits a substantially uniform compressive stress throughout the major portion of its width. This zone or compression band around the sheet may have a width of perhaps ½" in a ¼" thick sheet and should ideally be of a magnitude comparable to the compression which exists in the surface compression layers B although, even when the compression is of substantially smaller magnitude, distinct advantages will still be attained.

To describe the compression band or zone A more particularly, it consists throughout its thickness of glass that is in compression parallel with the adjacent edge. The remainder of the glass in the sheet 10, and which may be called the central area, will possess the normal laminar stress pattern of tempered glass. That is, the surfaces B are in high compression and the interior C is in high tension; although now there is an added, but small, regional tension component existing throughout the glass thickness.

The resultant stress in a light of glass having the special stress pattern of this invention will at every surface point be compressive and around the periphery, which has heretofore been particularly susceptible to damage due to fabrication, processing and handling, the protective compression band will extend inwardly from the edeg for a distance that is never less than the thickness of the major surface compression layers, and is preferably greater than the thickness of the glass sheet. The actual stress at any point may be considered to be the vector sum of the laminar and regional stresses at that point. In theory regional tension in the interior zone, which is a natural and inevitable consequence of the peripheral compression zone, would be of such small magnitude as to produce only a very minor weakening of the normally compressive laminar surface stress.

It will be understood that even in ordinary tempered glass sheets some sort of a protective compressive zone exists around the periphery even though no effort has been made to set up such a zone. However, this is merely a fortuitous consequence of the conventional method of tempering and the resulting zone is distinctly different both in stress pattern and in physical characteristics from the calculated protective peripheral compression band of this invention. Thus, measurements of an 8″ square of ordinary, commercially tempered ¼″ glass have shown a regional compression at the edge surface of 14,000 p.s.i. with a 24,000 p.s.i. maximum compression at the two opposite facing or major surfaces of the sheet. The regional compression at the edge surface drops rapidly to about 8,000 p.s.i. at $\frac{1}{32}$″ from the edge, to about 5,000 p.s.i. at $\frac{1}{16}$″ and to 0 at $\frac{3}{16}$″, with a regional tension of as much as 2,000 p.s.i. in the interior as a natural consequence.

While this type of edge compression does afford some protection to edge failure, it has two very important deficiencies. First, the total stress in the central laminae, except at the very edge, consists of this regional compression plus the local laminar tension and it is probable that a net tension exists very close to the edge. Second, the higher values of regional compression do not extend inwardly far enough to provide protection against the type of edge damage most often encountered in handling or processing sheets or plates of glass.

In contrast, measurements of an 8″ square of a preferred form of the specially tempered glass of this invention in ¼″ thickness will show a regional compression at the edge surface (as at D in FIG. 5) of 24,000 p.s.i., or more, with a 24,000 p.s.i. maximum compression at the two opposite major surfaces (B in FIG. 5) of the sheet. Moreover, regional compression of approximately 24,000 p.s.i. will obtain over the major portion of the ½″ compression band or zone (indicated at A in FIG. 5) with a rather rapid drop as it approaches the inner edge of the peripheral compression zone to a maximum interior regional tension of possibly as much as 5,000 p.s.i.

The special type of tempered or heat treated glass which is contemplated by this invention, and which exhibits the novel and altered stress pattern already described, may be produced in a number of specifically different ways. The important points being (1) that the sheet to be treated be first heated throughout its entire area to substantially the softening point of the glass, (2) that both the peripheral zone around the margin of the heated glass sheet and the opposite surfaces of the central portion of the sheet be cooled down through and beyond the annealing range while the interior of the central portion is still at a temperature above the annealing range of the glass, and before the entire sheet is finally reduced to room temperature.

One way in which a bent, tempered glass sheet may be produced in accordance with the invention is illustrated in FIGS. 1 to 3 of the drawings. As therein shown, the apparatus employed may comprise a conventional pit type furnace 11; a pair of horizontally opposed bending molds 12 and 13; and a pair of blast heads 14 and 15; all arranged in vertically aligned, superimposed relationship. A glass sheet 10, to be treated, is initially supported for vertical movement within the heating chamber 16 of the furnace 11 by means of tongs 17 attached to a suitable elevating mechanism 18.

Within the furnace 11, the glass plate is heated to substantially its point of softening and is then raised into position between the opposed molds 12 and 13. Reciprocatory motion is imparted to the molds by plungers 19, operating in air cylinders or the like 20, to first bring the molds into pressing engagement with the glass sheets to shape them to the desired contour, and then to rapidly retract the molds for a short distance from the sheet as shown in FIG. 3.

It will be noted in FIGS. 2 and 3 that the area of the molds is somewhat smaller than the area of the glass that has been pressed therebetween so that a marginal area of the sheet, indicated at 21, extends outwardly beyond the molds. With the molds in the position illustrated in FIG. 3, they act to shield the central portion of the glass sheet from the loss of heat in that area and also to reflect heat back toward the glass as indicated by the arrows at 22. On the other hand, the marginal portion 21 of the glass sheet that extends outwardly beyond the molds will be exposed to the atmosphere and so will be free to lose heat much more rapidly as indicated by the arrows 23. It will be understood that even greater heat differentials between the central and the marginal areas of the glass sheet can be created during this critical period by heating the molds 12 and 13 and/or by the provision of positive cooling means such as indicated at 24 in FIG. 1 and which may be employed to chill the margins 21 by air blasts or by absorption of radiant heat.

In any event, the glass sheet will be maintained between the closely spaced mold members 12 and 13 for a sufficient time to permit the marginal portion 21 of the sheet to be cooled down through the annealing range and to a point well below the annealing temperature of the glass, after which the sheet may again be elevated, this time into position between the blast heads 14 and 15 where blasts or jets of air will be directed onto opposite surfaces thereof simultaneously in the conventional manner to first chill the surfaces of the central area of the sheet in advance of the interior thereof and then to finally chill the entire sheet.

Additional ways in which glass sheets of either bent or flat shapes can be specially tempered or heat treated in accordance with this invention are illustrated in the following examples:

*Example I*

The sheet of glass to be tempered is heated in any suitable furnace to a uniform temperature well above the annealing point of the glass. Dielectric heater electrodes, sized to cover all but the outer ½″ of the sheet, are then brought into a position close to but not touching the glass. Sufficient power is next applied to the electrodes to keep the central area of the sheet above the annealing point while the marginal area is permitted to cool slowly (by gradually reducing the furnace temperature) to a predetermined value well below the annealing point. After this has been accomplished, the power to the electrodes is turned off and an air blast applied to the surfaces of the entire sheet.

*Example II*

Heat the glass sheet to a uniform temperature well above the annealing point in a furnace consisting of two concentric compartments which are mutually insulated. The outer compartment is to contain a ½″ marginal area of the glass, and the inner compartment is to contain the remaining central area of the glass. As before, the marginal area is permitted to cool slowly to a low temperature in the outer compartment of the furnace while the high temperature in the center zone of the furnace is retained. After the marginal area has reached a predetermined low temperature, the central area is blasted with air.

*Example III*

Heat the glass sheet to a temperature well above the annealing point and then place insulating pads the size and shape desired for the central area close to but not touching the glass. Next cause a cold air blast to strike the two surfaces of the glass with the insulating pads still in place. Then remove the insulating pads and again blast the entire sheet with cold air.

Example IV

Raise the temperature of a sheet of glass well above the annealing point. Next place a screen over the surface of the central area only. Blast the entire light with cold air as before. By selecting the screen with the proper mesh such as to block only part of the air flow, a stress pattern similar to that of the previous methods will be attained.

Any of these procedures will provide a stress pattern in the tempered glass which consists of the normal tempered laminar stress pattern with an added high compression regional stress thorughout the peripheral zone, and the resultant stress will be compressive for interior points much farther removed from the edge of glass sheets than heretofor contemplated.

Consequently, each of the methods set forth in the above examples will provide tempered glass sheets which exhibit distinct strength advantages over prior known tempered glass. Examples 3 and 4 may be considered to be the least desirable from the standpoint of the final stress pattern attained but they, along with the method described in connection with the apparatus described in the drawings, offer advantages in ease of accomplishment.

In addition to the outstanding advantage of resistance to breakage during handling and processing, glass sheets or plates produced by this invention, will be found to be better adapted to the many uses to which tempered glass is currently put and also to open up new fields for the use of tempered glass. Thus, tempered glass sheets that are used as windows in ovens, furnaces and other high temperature devices are subject to thermal gradients, incident to the operation of the apparatus, which produce temporary regional tension about the periphery of the glass. The peripheral compression zone in the glass sheets of this invention will effectively counteract such temporary tension and thus provide a greater safety factor.

It is to be understood that the forms of the invention herewith shown and described are to be taken as illustrative embodiments only of the same, and that various changes in the shape, size and arrangement of parts, as well as various procedural changes may be resorted to without departing from the spirit of the invention or the scope of the subjoined claims.

I claim:

1. In a sheet of tempered glass having its interior under tension and its major surfaces under compression, a marginal compression zone extending around the periphery of said sheet and being of a width greater than the thickness of the sheet.

2. A sheet of tempered glass having its interior under tension, compression layers at the major surfaces of said sheet, and a compression band extending around the periphery of said sheet with said band being at least as wide as the sheet is thick and of substantially the same magnitude as said compression layers.

3. A sheet of tempered glass having its interior under tension, compression layers at the major surfaces of said sheet, and a compression band extending around the periphery of said sheet with said band being at least as wide as the sheet is thick and of substantially the same magnitude as said compression layers and of substantially uniform compression throughout the major portion of its width.

4. In a tempered glass sheet having its interior under tension and its exterior under compression, an area wider than the thickness of said sheet and consisting of glass in compression parallel to an edge of said sheet.

5. In a method of tempering a glass sheet or plate in which the entire sheet is first heated to substantially the softening point of the glass, the steps of chilling a peripheral band extending inwardly from the edge of said sheet for a distance not materially less than the thickness of the sheet at a relatively accelerated rate and also chilling the surfaces of the central portion of said sheet but at a lesser rate to temperatures below the annealing range before chilling the interior of the central portion of the sheet.

6. A method of tempering a glass sheet or plate which comprises heating said sheet to substantially the softening point of the glass, chilling the marginal portion only of the heated sheet while substantially mantaining the temperature in the central portion thereof, and finally chilling the entire sheet.

7. In a mehod of producing tempered glass the steps of heating the glass to substantially is point of softening, then cooling the marginal portion of the heated glass down to a temperature below the annealing temperature thereof while holding the central portion at a temperature above said annealing temperature, and finally reducing the temperature of said sheet to a common level.

8. In a method of producing tempered glass the steps of heating the glass to substantially its point of softening, and rapidly chilling a peripheral zone of said heated sheet to a point below the annealing range of the glass while maintaining the central area at a temperature above said annealing range, before finally cooling the entire sheet.

9. In a method of producing tempered glass the steps of heating the glass to substantially its point of softening, then rapidly chilling the marginal portion of the heated glass down to a temperature below the annealing temperature thereof to temper the same while holding the central portion at a temperature above said annealing temperature, and finally rapidly chilling said sheet to temper said central portion.

References Cited in the file of this patent

UNITED STATES PATENTS

| | | |
|---|---|---|
| 1,879,699 | Long | Sept. 27, 1932 |
| 2,244,715 | Long | June 10, 1941 |
| 2,271,373 | Long | Jan. 27, 1942 |
| 2,298,709 | Long | Oct. 13, 1942 |
| 2,910,807 | Chan et al. | Nov. 3, 1959 |

FOREIGN PATENTS

| | | |
|---|---|---|
| 1,063,312 | France | Dec. 16, 1953 |
| 726,626 | Great Britain | Mar. 23, 1955 |